H. L. IDE.
ANIMAL OPERATED LIQUID DISTRIBUTER.
APPLICATION FILED OCT. 2, 1913.
1,096,244.
Patented May 12, 1914.
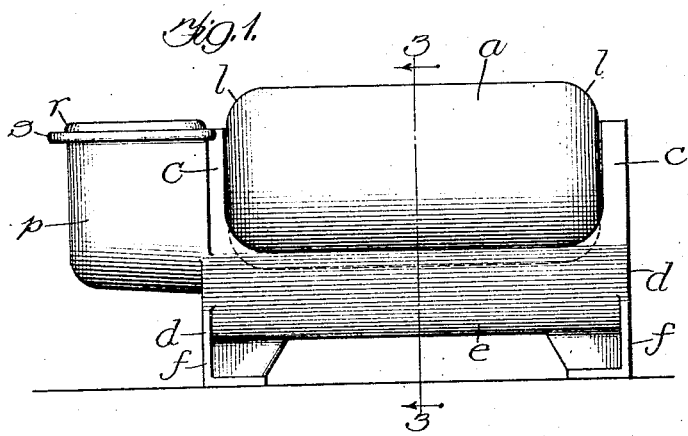
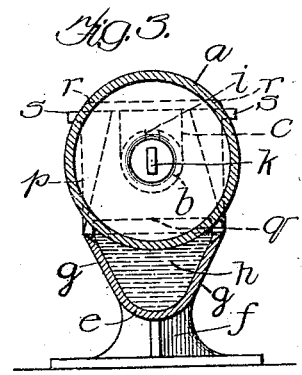
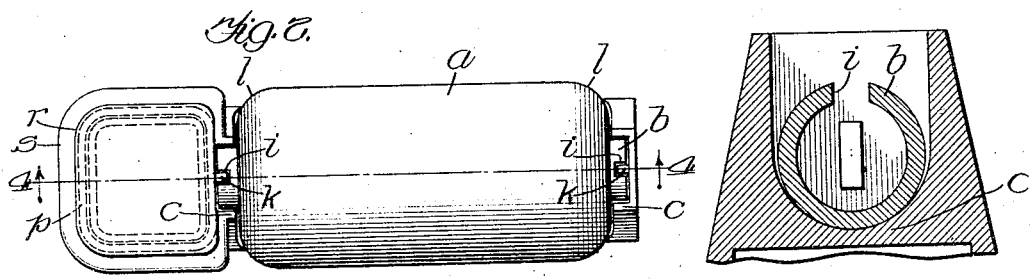
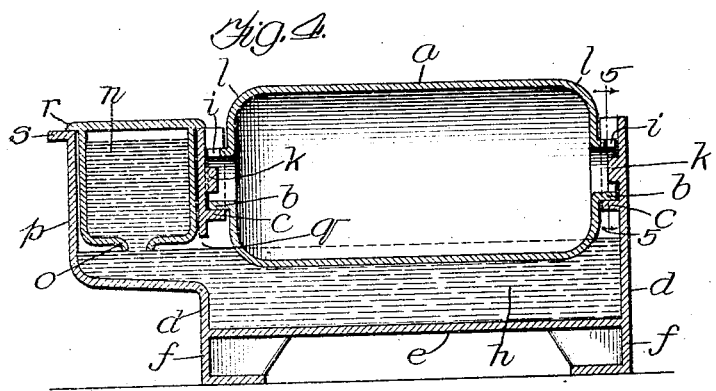
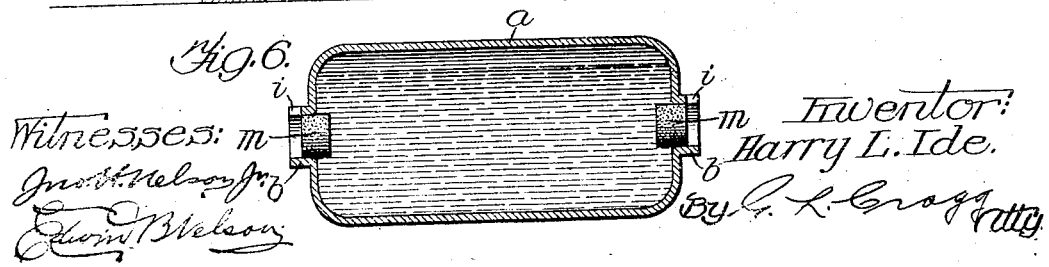
Inventor:
Harry L. Ide.

UNITED STATES PATENT OFFICE.

HARRY L. IDE, OF SPRINGFIELD, ILLINOIS.

ANIMAL-OPERATED LIQUID-DISTRIBUTER.

1,096,244. Specification of Letters Patent. Patented May 12, 1914.

Application filed October 2, 1913. Serial No. 793,036.

*To all whom it may concern:*

Be it known that I, HARRY L. IDE, citizen of the United States, residing at Springfield, in the county of Sangamon and State of Illinois, have invented a certain new and useful Improvement in Animal-Operated Liquid-Distributers, of which the following is a full, clear, concise, and exact description, reference being had to the accompanying drawings, forming a part of this specification.

My invention relates to devices which may be operated by animals, such as hogs, to cause such devices to apply suitable oil or other liquid to the skin of the animals to rid them of vermin and otherwise contribute to their comfort.

I will explain my invention more fully by reference to the accompanying drawing in which—

Figure 1 is a side view of the structure; Fig. 2 is a plan view partially in section; Fig. 3 is a vertical section on line 3 3 of Fig. 1; Fig. 4 is a longitudinal section on line 4 4 of Fig. 2; Fig. 5 is a vertical section on line 5 5 of Fig. 4; and Fig. 6 is a longitudinal section of the roller showing its use as a container, the drawing showing but one embodiment of the invention.

Like parts are indicated by similar characters of reference throughout the different figures.

The horizontally mounted roller $a$ is provided with trunnion projections $b$ at its ends, these projections being substantially co-axial with the roller. The trunnions $b$ are supported by the bottom parts of the insetting pockets $c$ which are formed in the upper extensions of the end walls $d$ of a trough $e$. The trough is provided with suitable pedestals $f$ to permit attachment of the device to a suitable foundation structure. The longitudinal side walls $g$ of the trough $e$ are disposed below the horizontal plane passing through the axis of the roller $a$. The horizontal plane in which the upper margins of the side walls $g$ are included also preferably includes the chord subtending an arc of, say 70°, of the circle of the roller $a$ whereby less than one-fifth of the roller is projected into the disinfecting liquid $h$ in the trough. 55° of the roller circle thus intervene between each end of the horizontal diameter of such circle and the intervening segment of the roller which is immersed within the liquid, the sides of the roller thus well overhanging the underlying trough. The hog thus has opportunity to rub against the lower half of the roller thereby readily to effect its rotation, means being provided for preventing the hog from materially lifting the roller out of the trough as it rapidly revolves the roller. To this end the trunnions are desirably made hollow, a slot $i$ (extending longitudinally of the roller) extending through each trunnion to permit of the passage of insetting vertically elongated or upright lugs $k$ (cast upon the trough structure and extending short distances into the pockets $c$) when the roller is to be mounted within its bearings. The slots $i$ are but a trifle wider than the width of the upright lugs $k$ so that in all positions of the roller, excepting that which the roller is caused to assume for the purpose of its assembly or removal, the slots $i$ cannot be passed over the lugs $k$ whereby the roller cannot well be dislodged as it is being rapidly turned.

The lugs $k$ are sufficiently shorter than the internal diameters of the hollow trunnions $b$ and are so disposed with respect to the pockets $c$ as always to permit limited bodily elevation of the roller, a feature which is of advantage when taken in conjunction with a trough whose liquid holding space completely underlies the axis of rotation of the roller, since any water that may have been caught in the trough cannot, in freezing, burst the machine by the upward pressure which the freezing water would exert upon the roller. The low trough has the additional advantage of having the upper edges of the side walls $g$ thereof sufficiently removed from the hog as ordinarily to prevent it from scraping mud and dirt from its body into the trough, thereby consequently preventing the trough from being choked. The external surface of the roller itself is smooth, to prevent the roller from scraping dirt from the hog, the smooth surface of the roller also avoiding irritation of the skin. The ends of the cylindrical roller are rounded at $l$, the entire roller thus being of a formation which will enable it, as it is being turned, to transfer oil or other liquid to various portions of the body of the hog, the rounded ends of the roller being particularly adapted to transfer the oil to the ear and shoulder portions of the animal.

As the manufacturer may wish to supply the consumer with an initial quantity of oil or other suitable liquid, I preferably make the roller hollow to act as a container for such oil, in which event the roller is desirably made of metal. The bore of either or each of the hollow trunnions $b$ is inwardly extended to have communication with the interior of the roller so that the liquid may be poured through either or each end of the roller into the roller interior, each hollow trunnion being corked at $m$ (Fig. 6), these corks not interfering with the machine after its assembly for shipment and being readily withdrawn at the point of destination to permit of the discharge of the entire roller contents to the trough. The roller $a$ thus constitutes a bottle and the trunnions $b$ constitute bottle necks through which bottle contents are taken and discharged.

Enough oil or other liquid may be contained in the roller $a$ to fill the trough. A reservoir for an additional quantity of such oil or other liquid for replenishing the oil in the trough and maintaining the oil level in the trough substantially constant is preferably provided. This reservoir desirably consists of a removable inverted bottle $n$ whose discharge neck $o$ terminates at the level of the oil in the trough when the bottle $n$ is in position. As the oil is removed from the trough the oil in the trough is correspondingly replenished by oil from the bottle $n$ which flows out of the bottle until the level of oil in the trough reaches and seals the bottle neck. The container $p$ for the bottle is desirably cast integrally with the trough, the interior of the container having communication at $q$ with the trough below the normal level of the oil in the trough, the passage at $q$ also extending above this oil level, the whole arrangement being such that the oil may readily flow between the bottom of the bottle container and the trough. The end wall of the bottle $n$ opposite the bottle mouth $o$ is desirably outwardly flanged or projected as indicated at $r$ (the bottle $n$ being preferably made of cast iron) the outsetting projections $r$ of the bottle resting upon the top edge of the container so as to position the lower end of the bottle neck $o$ at the proper level of the oil in the trough.

It has been found that the animal, after having transferred a quantity of oil from the rotating roller to his skin, will go to the bottle container to rub his body against it to spread and rub in the oil. To prevent the animal from engaging the flange $r$ in this operation, the bottle container is provided with outsetting projections or flanges $s$ extending outwardly beyond the outsetting projections $r$, the outsetting projections $s$ thus preventing the animal from reaching the projections $r$. Thus the level of the bottle cannot be disturbed by the hog whereby the level of the oil in the trough is maintained constant as long as there is a supply in said bottle and, further, the oil is thus not wasted.

Having thus described my invention I claim as new and desire to secure by Letters Patent the following:—

1. A device for enabling an animal to apply liquid to its skin including a trough for holding the liquid; a horizontally mounted roller overhanging a longitudinal side of the trough and projecting into the trough space to enable it, as it is being turned by the animal, to transfer liquid from the trough space to the animal; bearings in which the roller is supported and at least one of which is open at its upper portion to permit removal of the roller when it is lifted; and means normally serving to prevent the animal from materially raising the roller from its bearings.

2. A device for enabling an animal to apply liquid to its skin including a trough for holding the liquid; a horizontally mounted roller overhanging a longitudinal side of the trough and projecting into the trough space to enable it, as it is being turned by the animal, to transfer liquid from the trough space to the animal, said roller having a hollow longitudinally slotted trunnion extension while the trough structure is provided with a pocket bearing for receiving this trunnion extension; and an insetting elongated upright lug carried by the pocket bearing and receivable within the interior of the trunnion extension, the width of the slot in the trunnion extension being not materially in excess of the width of the lug whereby the lug and trunnion extension normally operate to prevent the animal removing the trunnion extension from its bearing.

3. A device for enabling an animal to apply liquid to its skin including a source of liquid supply; and a hollow roller operable by an animal and serving to transfer liquid from said source of liquid supply to the animal, there being an opening in said roller to afford access to its interior whereby said roller may act as a container.

4. A device for enabling an animal to apply liquid to its skin including a source of liquid supply; and a hollow roller operable by an animal and serving to transfer liquid from said source of liquid supply to the animal, said roller having a trunnion extension to enable it to be rotatably mounted, said trunnion extension being hollow and affording communication between the interior and exterior of the roller to constitute the roller a container.

5. A device for enabling an animal to apply liquid to its skin including a source of liquid supply; and a horizontally mounted hollow roller operable by an animal and serving to transfer liquid from said source of liquid supply to the animal, said roller having a trunnion extension to enable it to be rotatably mounted, said trunnion extension being hollow and affording communication between the interior and exterior of the roller to constitute the roller a container.

6. A device for enabling an animal to apply liquid to its skin including a trough for holding the liquid; and a horizontally mounted roller overhanging a longitudinal side of the trough and projecting into the trough space to enable it, as it is being turned by the animal, to transfer liquid from the trough space to the animal.

7. A device for enabling an animal to apply liquid to its skin including a source of liquid supply; and a horizontally mounted roller operable by an animal and serving to transfer liquid from said source of liquid supply to the animal, said roller being accessible for operative engagement by the animal below the horizontal diameter of the circle of the roller.

In witness whereof, I hereunto subscribe my name this 29th day of September A. D., 1913.

HARRY L. IDE.

Witnesses:
G. H. GRANT,
C. A. BROWN.

Copies of this patent may be obtained for five cents each, by addressing the "Commissioner of Patents, Washington, D. C."